(12) United States Patent
Chakra et al.

(10) Patent No.: US 9,092,760 B2
(45) Date of Patent: Jul. 28, 2015

(54) EMAIL HISTORY HANDLER THAT CHOOSES HISTORY SEGMENTS TO INCLUDE WITH A COMMUNICATION REPLY

(75) Inventors: Al Chakra, Apex, NC (US); Liam Harpur, Skerries (IE); Mark Kelly, Skerries (IE); John Rice, Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 565 days.

(21) Appl. No.: 12/981,162

(22) Filed: Dec. 29, 2010

(65) Prior Publication Data

US 2012/0173632 A1 Jul. 5, 2012

(51) Int. Cl.
*G06F 15/16* (2006.01)
*G06Q 10/10* (2012.01)
(52) U.S. Cl.
CPC .................................. *G06Q 10/107* (2013.01)
(58) Field of Classification Search
USPC ....................................................... 709/206
See application file for complete search history.

(56) References Cited

U.S. PATENT DOCUMENTS

| 8,407,217 | B1 * | 3/2013 | Zhang ........................... 707/731 |
| 2004/0044735 | A1 | 3/2004 | Hoblit |
| 2008/0120383 | A1 | 5/2008 | Kumar et al. |
| 2008/0294727 | A1 | 11/2008 | Moody et al. |
| 2008/0294730 | A1 | 11/2008 | Oral et al. |
| 2009/0037537 | A1 | 2/2009 | Callanan et al. |
| 2009/0106367 | A1 * | 4/2009 | Banerjee et al. ............... 709/206 |
| 2009/0132664 | A1 | 5/2009 | Radenkovic et al. |
| 2009/0313346 | A1 * | 12/2009 | Sood ............................. 709/207 |
| 2010/0088377 | A1 | 4/2010 | Johnson et al. |
| 2010/0169445 | A1 | 7/2010 | Tada |
| 2010/0208290 | A1 | 8/2010 | Fan |
| 2010/0223341 | A1 | 9/2010 | Manolescu et al. |

OTHER PUBLICATIONS

IBM, "E-mail reply with partial history," IP.COM No. IPCOM000142589D, Nov. 3, 2006.

* cited by examiner

*Primary Examiner* — Angela Nguyen
(74) *Attorney, Agent, or Firm* — Patents on Demand P.A.; Brian K. Buchheit; Scott M. Garrett

(57) ABSTRACT

A response event to provide a communication reply can be detected. The reply can be to an email message which is part of an email conversation. The email conversation can include a sequence of zero or more response email messages to an initial email message as well as the initial email message. Attributes of different ones of the email messages can be queried. A quantity N can be determined based on values of the attributes being compared against at least one history criteria. The quantity of N can vary based on the values and the history criteria. A reply history set can be created that includes a set of history segments. Each history segment can correspond to one of the N different ones of the email messages of the email conversation. The reply history set can be incorporated within the communication reply.

16 Claims, 7 Drawing Sheets

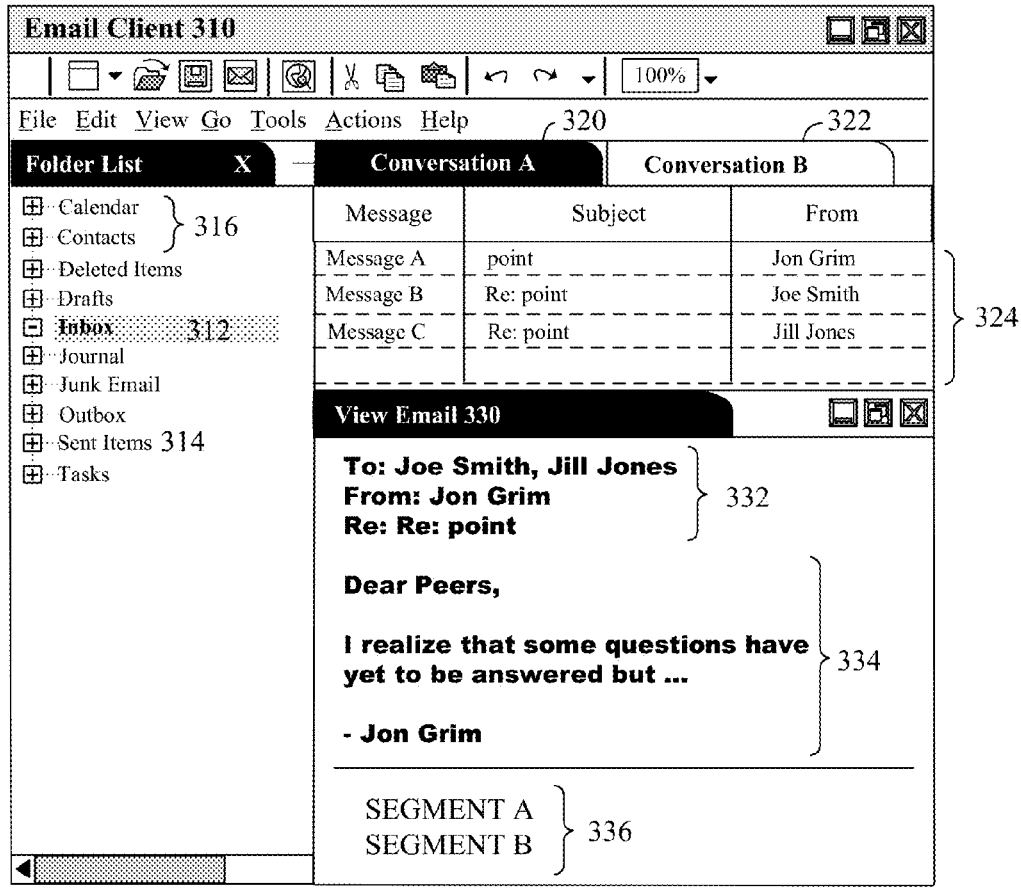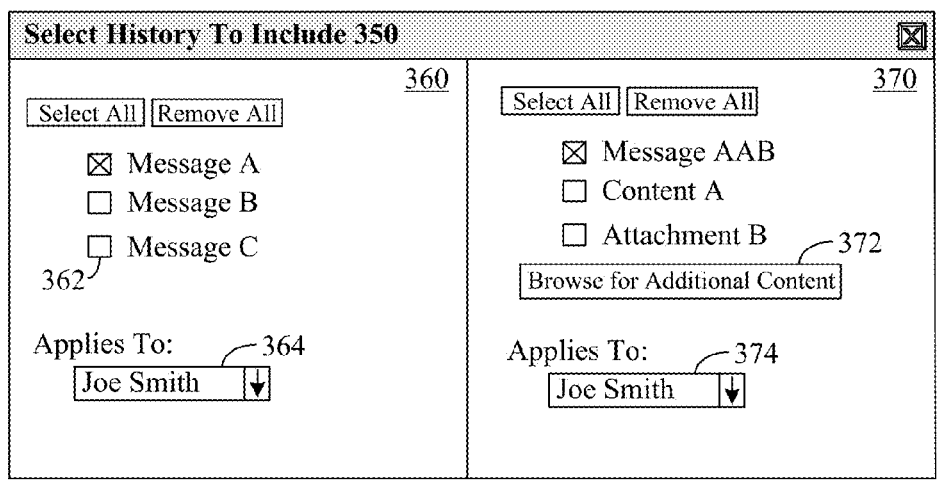
FIG. 3

Configure History Handling 410

Options Based on Response Time  Enable ☒  Weight [10]

Exclude history if response before [30 Minutes] from sent message — 422

Include history if response after [5 Days] from sent message — 424

420

☒ Use sender preferences only 432
☐ Use recipient preferences only 434

430

Quantity Min/Max Establishment  Enable ☒  Weight [10]

Provide at most [5] history messages based on: — 442

☒ Time (Sequential) 444
    ☐ Relevancy 445
    ☒ Key Words 446
    ☐ Other *click to specify* 447

440

☒ Always provide content [60%] relevant or more to recipient — 452

450

☐ Include relevant messages from other email conversations

460

☒ Include relevant messages from other content sources
    ☒ Web 472
    ☐ Corporate Files 473
    ☒ Attachments 474
    ☐ Other *click to specify* 475

EMAIL HISTORY HANDLER THAT CHOOSES HISTORY SEGMENTS TO INCLUDE WITH A COMMUNICATION REPLY

BACKGROUND

The present invention relates to the field of email systems and, more particularly, to an email history handler that chooses history segments to include with a communication reply.

Email conversations, also referred to as email threads, can include a sequence of responses to an initial email message. In an email conversation, a set of users who receive an initial message often respond back and force using a reply or a reply all option. The original sender (and other recipients) can respond back using a reply or a reply all option, and so forth. Sometimes, new participants can join an email discussion, after they receive a forwarded message from one of the participants. Email conversations can be provided with or without history, where the history shows the sequence of responses in a chain of responses, which may include all email messages between a current one all the way back to the initial email message.

BRIEF SUMMARY

One aspect of the disclosure can include a method, computer program product, apparatus, and system. In the aspect a response event to provide a communication reply can be detected. The reply can be to an email message which is part of an email conversation. The email conversation can include a sequence of zero or more response email messages to an initial email message as well as the initial email message. Each of the response email messages and the initial email message can have a set of attributes unique to that message. The set of attributes can include a time at which that message was sent. Attributes of different ones of the email messages can be queried. A quantity N can be determined based on values of the attributes being compared against at least one history criteria. The history criteria can include traffic based criteria, behavior based criteria, time based criteria, content based criteria, sender specific criteria, and/or recipient specific criteria. The quantity of N can vary based on the values and the history criteria. A reply history set can be created that includes a set of history segments. Each history segment can correspond to one of the N different ones of the email messages of the email conversation. The reply history set can be incorporated within the communication reply.

Another aspect of the disclosure can include a method, computer program product, apparatus, and system. In this aspect, a communication reply can be prepared. A sent time can be determined for an email message of the email conversation which the communication reply is in response to. A time-to-response can be computed by subtracting a current time from the determined sent time. In response to determining that the time-to-response is less than a previously established threshold time, a first history set can be determined as a reply history set. In response to determining that the time-to-response is not less than the previously established threshold time, a second history set can be determined as the reply history set. The second history set can include a quantity of messages that is less than a quantity of messages of the first history set. The reply history set can include a set of message body content segments, where each message body content segment corresponds to content of an email body of different ones of the email messages of the email conversation. The reply history set can be incorporated within the communication reply.

Another aspect of the disclosure can include a method, computer program product, apparatus, and system. In this aspect, a communication reply can be prepared. Attributes or content of different ones of the email messages of the email conversation can be queried. A quantity N can be determined based on values of the attributes or content. The quantity N can vary based on the values of the attributes or content. N can be a quantity of email messages of the email conversation, where N is an integer greater than zero and less than the total number of email messages in the email conversation. A reply history set can be created that includes a set of message body content segments, where each message body content segment corresponds to content of an email body of N different ones of the email messages of the email conversation. The reply history set can be incorporated within the communication reply.

BRIEF DESCRIPTION OF THE SEVERAL VIEWS OF THE DRAWINGS

FIG. 3 shows possible graphical user interfaces for an email client interface, which intelligently handles email history in accordance with an embodiment of the disclosure.

FIG. 4 shows a user interface permitting a user to configure operation relating to an email history handler in accordance with an embodiment of the disclosure.

DETAILED DESCRIPTION

Figure 1:
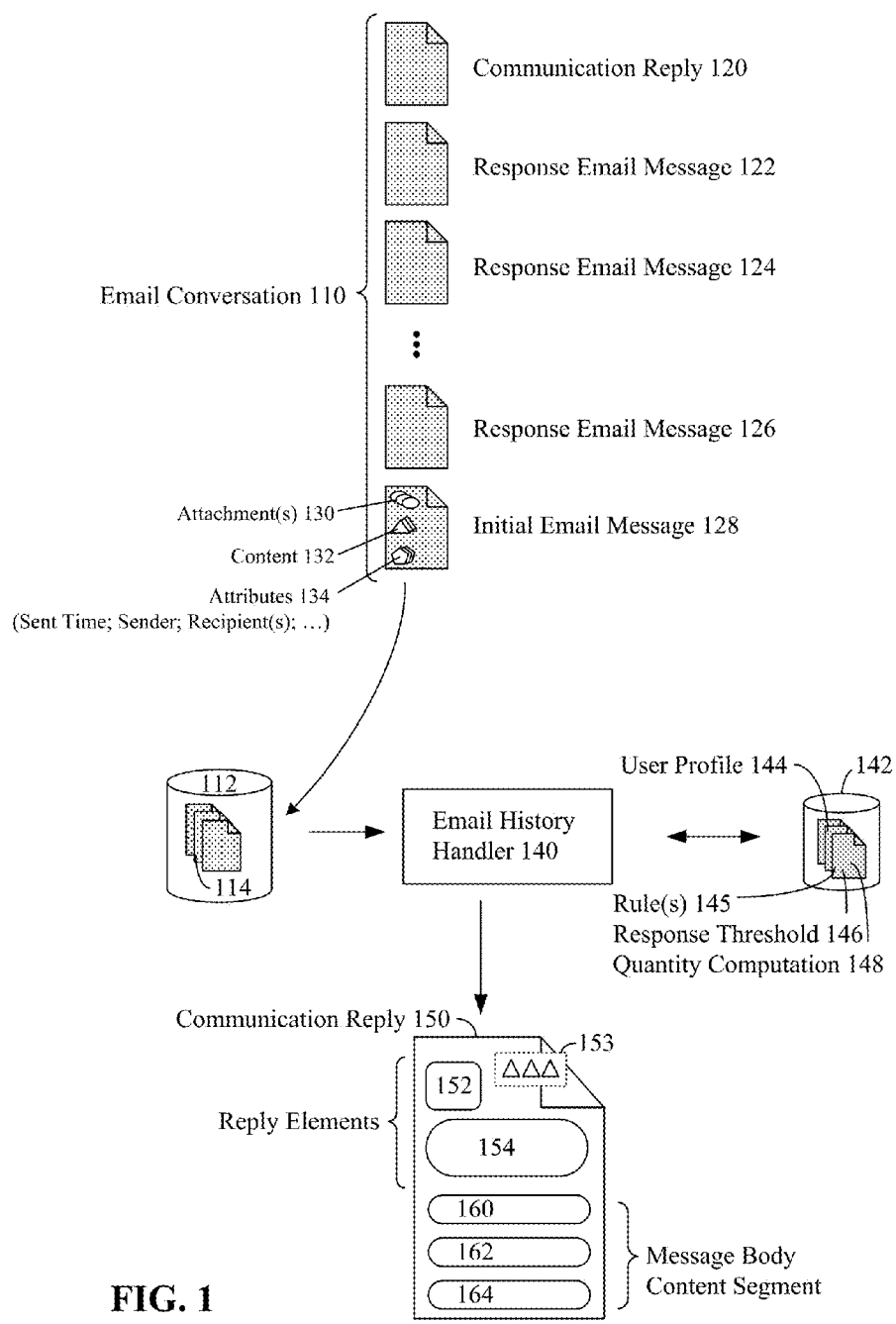
FIG. 1 is a diagram showing an email conversation, for which history is automatically gathered and placed in a response message based on variable criteria in accordance with an embodiment of the disclosure.

Conveyances of email history can be a significant resource expense. That is, email history can consume bandwidth, storage space, and processing cycles. Further, extensive message history can make it harder for a recipient to digest email content in many circumstances.

Conventional techniques for email history provide a user with an option to reply with or without history. If a reply is with history, a user may manually edit the history. In practice, most users choose not to manually edit the history, which results in many email communications including stale and exceptionally lengthy history.

The disclosure provides an email history handler that chooses which of a set of email messages are to be included in an email history. The selection can be based on a variety of criteria, such as time to respond, traffic, sender behavior, recipient behavior, relevancy, and the like. Additionally, a specific quantity (N) of email messages to be included in a reply message can be determined. In one embodiment, content outside that of an email conversation, such as email messages from other conversations and/or Web content can be included in a communication reply.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram showing an email conversation 110, for which history 160-164 is automatically gathered and placed in a response message based on variable criteria in accordance with an embodiment of the disclosure. More specifically, an email history handler 140 can determine whether to include zero or more message body content segments 160, 162, 164 within a communication reply 120, 150, and can determine which segments 160-164, if any, are to be selected for inclusion. The communication reply 120, 150 can be a reply being constructed in response to any of the messages 122-128 in the email conversation 110. The message body content segment 160-164 can correspond to one email message 122-128 of an email conversation 110.

The email conversation 110 can include an initial email message 128, and a set of zero or more response email messages 126, 124, 122. The response email messages 122-126 can be responses to the initial message 128 or can be responses to other ones of the response email messages 122-126, at least one of which is a response to the initial email message 128.

Each email message can be a digital message able to be stored in a storage medium that is able to be conveyed across the internet or other computer network. Email messages can be facilitated by an email system based on a store- and forward model. That is, an email server can accept, forward, deliver, and store email messages conveyed to it by clients. In contemplated embodiments, email messages 120-128 can be carried over a network by a simple mail transfer protocol (SMTP), a file transfer protocol (FTP), or other protocol. In contemplated embodiments, client applications can use post office protocol (POP), the internet message access protocol (IMAP), various proprietary systems (e.g., LOTUS NOTES/DOMINO, MICROSOFT EXCHANGE, etc.), and the like to access mail box accounts maintained by an email server. In one embodiment, email messages 120-128 can conform to Multipurpose Internet Mail Extensions (MIME) based standards.

Each email message 120-128 can include zero or more attachments 130, email content 132, and a set of attributes 134, which are specific to that email message. The attachments 130 can be computer files that are sent along with an email message. If responding to an email message in the conversation 110, attachments of the message for which a response is provided may or may not also be included, depending on implementation choices.

That is, in one embodiment, attachments 130 may not be considered part of an email history handled by handler 140. Even if not explicitly included in the history, however, content of attachments 130 can be considered if determining which history messages (e.g., message body content segments 160-164) are to be included in a communication reply 120, 150. In another embodiment, a set of attachments 153 from previous messages (e.g., considered history) can be included in the communication reply 120, 150, where the selected attachments 153 to include are determined by the email history handler 140.

Message content 132 can include content from the message body (body 154 of reply 150, for example) of a corresponding email message. The message content 132 can include plain text, HTML, formatted text, and/or media content. History can be placed in a communication reply 150 within the message body segment of that email message.

More specifically, message body content segments 160-164 can be included in a communication reply 150. Each of the message body content segments 160-164 can include complete or partial content form the message body of a corresponding email message 122-128. Additionally, each message body segment 160-164 can include attributes 134 from the corresponding email message, such as information from a header of that message.

The attributes 134 can include information from a message header of a corresponding message, as well as metadata associated with the email and/or maintained by an email server. Attributes 134 can include, for example, from, subject, to, carbon copy, blind carbon copy, sent time, and other information.

The email history handler 140 can be a computer program product able to be stored on a storage medium, which is executable by a computing device having a processor. The email history handler 140 can access email communication data 114 stored in a data store. The communication data 114 can include a set of email conversations 110.

Email history handler 140 can also access decision making information stored in data store 142, which may or may not be the same component or geographic location as data store 112. That is the decisions of handler 140 can be data driven ones. The driving data can include user profiles 144, such as profiles established for a reply sender and/or a reply recipient. Decision making can be based on a set of configurable rules 145, thresholds 146, and other programmatic conditions.

In one embodiment, a quantity computation 148 can be performed by the email history handler 140 to determine a quantity (N) of response messages 122-128 that are to be included (in the message body content segments 160-164) in the reply 150. In one embodiment, a time based condition can be used to determine whether to include any history (message body content segments 160-164) in a reply and/or a quantity of historical segments 160-164 that are to be included. For example, in one scenario, history (segments 160-164) can be excluded if a reply is made within X time (e.g., one of the response thresholds 146) of the sent time of the email message 122-128 to which the reply is made, where history (segments 160-164) is included in the reply if X time is exceeded.

In one embodiment, history included in the message body content segments 160-164 (or attachments 153) is not to be limited to messages that are part of the email conversation 110. For example, often "side" messages that branched from the conversation 110 can be especially relevant, in which case the email history handler 140 can determine the relevancy (in one contemplated embodiment) and include that message within a corresponding segment 160-164. Further, content included in a segment 160-164 included need not be related to the email conversation 110 directly. For example, a set of recipients and sender(s) of the email conversation 110 may lack any commonality with a sender/recipient set of a message selected as being relevant. In one contemplated embodiment, content not derived from any previously sent message (such as Web content) can be gathered and placed in a content segment 160-164 based on relevancy to a current message (content 154) or the conversation 110, as determined by handler 140.

Figure 2:
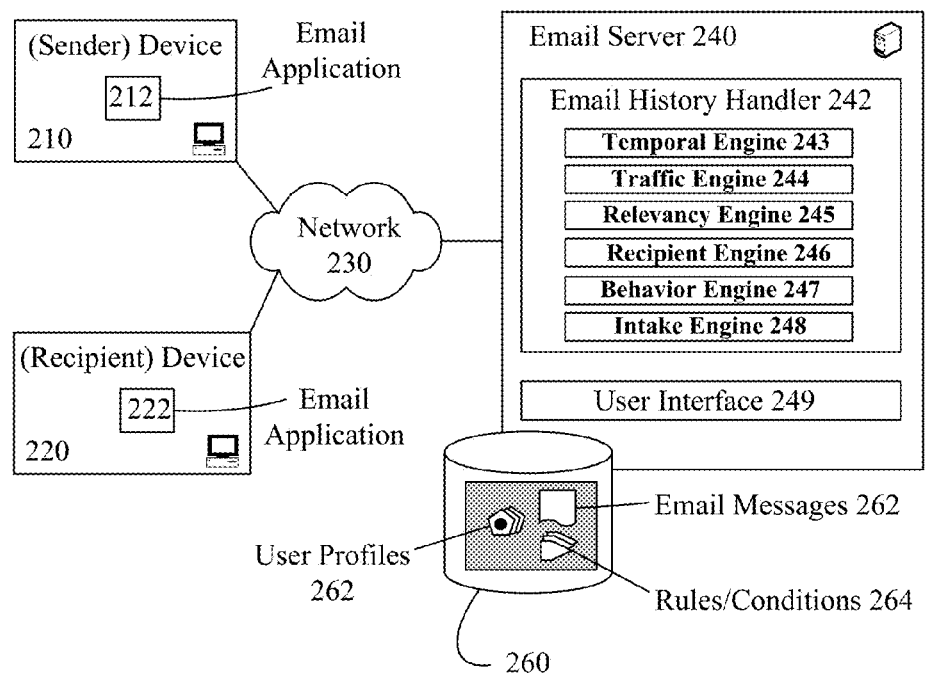
FIG. 2 shows a system in which an email history handler is implemented in accordance with an embodiment of the disclosure.

FIG. 2 shows a system 200 in which an email history handler 242 is implemented in accordance with an embodiment of the disclosure. In one embodiment, the specifics of FIG. 1 can be implemented using the system 200 shown in FIG. 2. In system 200, a set of computing devices 210, 220 can be connected to a network 230 to which an email server 240 is also connected.

Each computing device 210, 220 and server 240 can include at least one processor, circuitry, storage medium, peripheral, network interface, and/or other components; all communicatively linked to each other via a bus. The processor of each device 210, 220, 240, can execute computer readable instructions, such as instructions of an operating system, firmware, email application 212, 222 email server software (such as handler 242 on server 240), and the like. Each computing devices 210, 220 can be a personal computer, a notebook computer, a netbook, a kiosk, a mobile phone, and the like. The email server 240 can be a stand-alone computing device, a distributed set of computing devices, and/or a virtual server implemented using virtualization software.

Email server 240 can store and manage email messages 262, where the storage of messages can occur in data store 260. Data store 260 can also include user profiles 262 and rules/conditions 264, both of which are used by email history handler 242. Additional user settings can alternatively or conjunctively be stored at a client, such as in a data store of device 210 or 220. In one embodiment, the email server 240 can be designed to function as a backend for a set of client-side email applications 212, 222. In one embodiment, the email server 240 can include Web server functionality to serve email to client-side browsers. Thus, email applications 212, 222 can include client-side email applications as well as browsers for rendering a Web email client interface.

The email server 240 can include an email history handler 242 and a user interface 249. The user interface 249 can be a human to machine interface though which settings, parameters, rules, and conditions of the email server 240 can be viewed and adjusted by authorized users, which can include administrators and various users, such as email senders and email receivers. The interface 249 can be a server-side interface accessible via a browser or other suitable front-end. In one embodiment, the interface represented by user interface 249 can actually be implemented as part of a user interface of a client side email application 212, 222.

The email history handler 242 can be operable to automatically determine a set of email messages that are to be provided within a communication reply (e.g., reply 150) as history (e.g., one or more of segments 160-164). In one embodiment, email history handler 242 can use or include zero or more of a temporal engine 243, a traffic engine 244, a relevancy engine 245, a recipient engine 246, a behavior engine 247, and an intake engine 249.

The temporal engine 243 can determine times between various email-history related events, which are linked to conditions used to determine whether one or more history segments will be included within an email response. In a simple form, the temporal engine 243 can use a sent email time of the message to which a reply is being sent and subtract this time from a current time, to produce a time-to-response. If this time-to-response is less than a threshold (established by conditions 264) no email history may be necessary. Multiple time constraints can be established and can be used to determine a quantity of history segments to be sent (N segments) with a communication reply. The temporal engine 243 can use times between any set of messages within an email conversation to determine which history segments are to be included. For example, only messages sent after time X can be included in the history in one scenario. In another scenario, a time-spread sampling of history segments can be selected, based in part upon times computed by temporal engine 243.

Traffic engine 244 can use an amount of data/content within an email conversation, a quantity of email message in a user's inbox, a quantity of message sent by a user, and other traffic based criteria to determine a set (e.g., N) of history segments that are to be included in a communication reply. For example, if an amount of email traffic received within X days is greater than an established threshold, it can be more likely that a recipient has forgotten email content (due to information overload), which can bias email history handler to include history if constructing a communication reply message to that specific recipient. Traffic engine 244 can also be used to compute which percentage of a given email conversation (or communication reply) constitutes history, which can be a factor used by email history handler 242.

It should be appreciated from the above that programmatic decisions or determinations made by handler 242 (or engines 243-248) can be based on sender specific factors, recipient specific factors, or a combination of the two. Thus, different recipients of the same communication reply can receive different history segments, as determined by hander 242, in one contemplated embodiment of the disclosure.

Relevancy engine 245 can analyze specific email messages (e.g., messages 262) from an email history and determine a relevancy score or value for that message in context of a current communication reply. The relevancy can be based on the email conversation in general, or upon the content contained in the body of the communication reply in particular. In one embodiment, relevancy scores, as determined by engine 245, can also vary on a recipient-by-recipient basis based on recipient specific criteria. In one embodiment, the relevancy engine 245 can determine relevancy scores for email messages 262 outside an email conversation for which the communication reply is provided. Additionally, in one embodiment, the relevancy engine 245 can computer relevancy scores for other content, such as attachments, system stored documents, Web accessible content, and the like, which can be used to determine whether handler 242 includes that content within a history segment of a communication reply or not.

The recipient engine 246 can make history segment handling adjustments based on recipient specific factors or conditions. In one embodiment, a user profile 262 can be maintained for recipients and senders, which can be used by engine 246.

The behavior engine 247 can capture and maintain behavioral information for recipients and senders, which can have an effect on whether history segments are conveyed in a communication reply or not. For example, behavior engine 247 can determine an amount of time spent by a specific user reading history of an email conversation, where if this time is over a previously established threshold, it can be assumed that that recipient is familiar with the history so that it need not be provided in a communication reply. In another embodiment, behavior engine 247 can record metrics of the average time a user spends reading history segments compared to new email, which can be used by handler 242. In another scenario, the behavior engine 247 can determine what activities a specific recipient has performed between sending and receiving email messages of the email conversation. Thus, if a recipient was going relatively simple tasks between sending/receiving messages, the handler 242 in one embodiment may be configured to determine that substantial history segments need not be included for that recipient.

The intake engine 248 can impose recipient-side (or recipient only) filters on history segments. Thus, even though a sender many send X number of history segments within an email message directed to a recipient, the intake engine 248 can filter (remove Y) history segments from this, so that the recipient actually receives X-Y history segments. The intake engine 248 can operate independent of other aspects of the email history handler 242 in one embodiment. For example, intake engine 248 can be a client-side engine (part of email application 212, 222 or operating in conjunction with application 212, 222), which filters history for a recipient to prevent information overload.

The engines 243-248 are presented for illustrative purposes only and are not intended to be comprehensive. Instead, the engines 243-248 are intended to demonstrate that extensible capabilities based on a variety of criteria can be implemented for email history handler 242, to permit handler 242 to make more intelligent decisions regarding history segment inclusion than is possible with known conventional teachings.

Network 230 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 230 can include local components and data pathways necessary for communications to be exchanged among computing device components and between integrated device components and peripheral devices. The network 230 can also include network equipment, such as routers, data lines, hubs, and intermediary servers which together form a packet-based network, such as the Internet or an intranet. The network 230 can further include circuit-based communication components and mobile communication components, such as telephony switches, modems, cellular communication towers, and the like. The network 230 can include line based and/or wireless communication pathways.

Each device 210, 220 and server 240 can include a data store, such as data store 260, which is physically implemented within any type of hardware including, but not limited to, a magnetic disk, an optical disk, a semiconductor memory, a digitally encoded plastic memory, a holographic memory, or any other recording medium. The data stores can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

FIG. 3 shows possible graphical user interfaces 310, 350 for an email client interface 310, which intelligently handles email history in accordance with an embodiment of the disclosure. The email application client interface 310 can be a front end for a back-end server, such as email server 240. The illustrated user interface 310 is not intended to be comprehensive of contemplated interface elements, but is intended to visually illustrate a few features of one embodiment of the disclosure in a simple to digest form.

As shown, the front end interface 310 includes an inbox 312 for received email messages, a sent items 314 section for sent email messages. Interface 310 can, but need not, include additional elements 316, such as a calendar, contact list, journal, drafts, and the like. Email message can be viewed in a viewing pane 330 of the interface 310. Thus, a header 332, body 334, history segments 336, attachments (not shown), and other related information.

In one embodiment, the user interface 310 can be enhanced to group messages by email conversation, as shown by tab 320 and 322. Thus, a sequence of email messages 324 included in a selected conversation can be displayed. In a further embodiment, the conversation grouped email messages 324 can be used in lieu of including the history segments 336 within a body of response messages. That is, history segments (if any) 336 can be hidden from email messages, and can be shown instead in a selectable manner as part of corresponding email conversation. In such an embodiment, the messages 324 displayed in conversation form can be considered history segments 336 included in a selected email message 330 for purposes of interpreting a meaning of the history segment 336.

In one embodiment, if a communication reply (e.g., email message in response to a received message) is sent, an additional set of operations can be presented, as shown by interface 350. Interface 350 can be an optional pop-up window in one embodiment, where a user can choose via configurable options whether the pop-up window is to be presented or not. Further, configurable options can cause interface 350 to be presented upon a user selecting to reply to a previous message (i.e., while the email message is presented in interface 310 for editing) or to be presented if a communication reply message is sent (i.e., after a communication reply has been written and is being sent from the client to the email server). Further, options and history can be implemented at the email server, at the client via client-side code, or both, depending on implementation choices for implementing the disclosure.

The options can permit a user to manually select which email conversation messages, if any are to be included as history with the communication reply. Section 360 shows all messages linked to the current email conversation along with a selection box 362. In one embodiment, a set of default messages can be automatically selected, as determined by an email history handler program. A user can override or change these defaults by selecting or deselecting specific messages. Further, in one embodiment, selections within section 360 can be explicitly made for a specific set of recipients as represented by the "applies_to" element 364.

Section 370 shows additional content (other than email message part of the email conversation) that can be optionally selected to be included as history segments of the communication reply. Like section 360, a set of content items of section 370 can be automatically selected by the email history handler, which selection can, for example, be based on relevancy, most recent in time, and other criteria. A user can override defaults and explicitly select or deselect content presented in section 370, or can explicitly select content not shown in section 370, as shown by element 372. Further, in one embodiment, selections within section 370 can be explicitly made for a specific recipient or set of recipients, as represented by the "applies_to" element 374.

FIG. 4 shows a user interface 410 permitting a user to configure operation relating to an email history handler in accordance with an embodiment of the disclosure. In one embodiment, the user interface 410 can be a sample implementation of user interface 249. Options other than those shown in interface 410 are contemplated, and those illustrated in FIG. 4 are provided to illustrate a general concept of the disclosure.

In user interface 410, a user can choose a "weight" that is to be applied to various factors that the email history handler uses to determine how many history messages to include as well as which specific message are to include. Thus, a combination of factors, can be combined in response to determining what history is to be included in a communication reply. As shown, section 420 provides configurable options based on response time. For example, history can be excluded if a response is provided within X (configurable element 422) time of the sent message for which the communication reply is provided. Additionally, history can be included if the response is after Y (configurable element 424) time of the sent message, regardless of other factors used for the selection of email message. The options shown in section 420 are for illustrative purposes only and other options are contemplated.

Section 430 provides options to use sender preferences 432, recipient preferences 434, or both in response to determining whether to include history segments based on user-specific factors. In one embodiment, sender and recipient parameters and preferences can be recorded in user profiles, which an email history handler utilizes.

Section 440 provides a configurable quantity 442 of history segments to include in a message. The history segments can be selected based on a variety of criteria, such as time 444, relevancy 445, key words 446, and/or other 447.

Section 450 provides a configurable relevancy threshold 452, where messages/content having a relevancy score over the threshold 452 are included in a communication reply, and are otherwise not included. Other thresholds, such as a time-based one for including messages can be implemented in other embodiments.

Section 460 shows a configurable option to include relevant email messages from other email conversations, or not. Section 470 shows a configurable option to include relevant content from other sources, or not, and can permit a user to choose specific ones of these sources. Sources can include, but are not limited to, Web sources 472, corporate files 473, attachments 474, or other specifiable data set 475.

Figure 5:
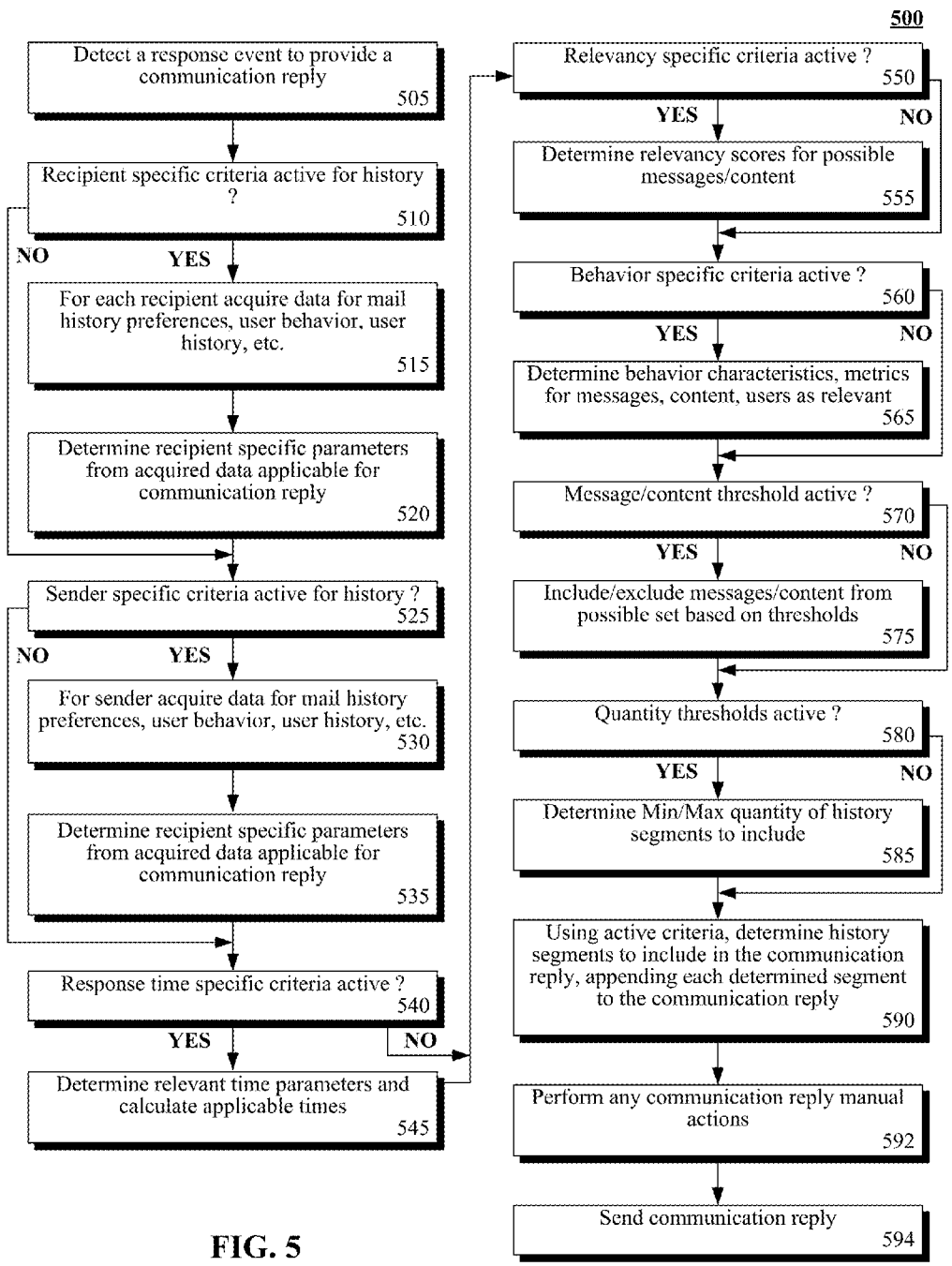
FIG. 5 shows a method for providing email history in accordance with an embodiment of the disclosure.

FIG. 5 shows a method 500 for providing email history in accordance with an embodiment of the disclosure. In one embodiment, method 500 can be performed in context of system 200 or other system having an email history handler, such as handler 140.

Method 500 can begin in step 505, where a response event to provide a communication reply can be detected. A response event can be one that causes an email, which is a reply conducted as part of an email conversation to be sent or can be one that causes a reply to be presented to a user for editing. Numerous criteria and factors for selecting whether to send history segments, a quantity of history segments that are to be sent, and specific history segments (and/or other content) that is to be sent with a communication reply. Not all of the contemplated criteria are expressed in method 500, nor are all the criteria of method 500 to be used in each embodiment of the disclosure.

For example, recipient specific criteria may or may not be active for determining history to send, as indicated by step 510. The recipient specific criteria can apply to a single recipient, and/or any established grouping of recipients, such as all recipients belonging to a given organization, company, participating on a specific project, and the like. If it is active, suitable data can be acquired for each recipient, which may include recipient-established preferences, past behavior, email history, etc., as shown by step 515. Once this information is acquired, recipient specific parameters can be determined, as shown by step 520.

In step 525, a determination can be made as to whether sender specific criteria are active for history. Sender specific criteria can be established for a single email user (e.g., the sender of a communication reply) and/or for any established set of people within which the sender belongs. Thus, organization or company specific history parameters can be established, which apply to all users of an organization's or company's email accounts. In step 530, sender- (or organization-) specific data can be acquired, which may include established preferences, user behavior, email history, and the like. From this acquired information, suitable parameters can be established, as shown by step 535.

Another factor that may be significant for determining email history to provide includes time specific criteria, which may or may not be active, as indicated by step 540. If active, relevant time parameters can be determined and applicable times can be calculated, as shown by step 545.

Relevancy specific criteria can also be utilized, as shown by step 550. If relevancy criteria are active, relevancy scores can be determined for any of the possible email messages or other content that is being considered for inclusion within a communication reply, as shown by step 550.

Behavior specific criteria may also be used for email history purposes, as shown by step 560. If behavior specific criteria are active, step 565 can execute, where behavior characteristics, metrics for messages, content, and the like for each relevant user (sender and/or recipient(s)) can be determined.

In one embodiment, thresholds can be established, which are thresholds or criteria for automatic exclusion (e.g., filtering) or inclusion of specific messages or content, regardless of other selection criteria, as shown by step 570. If active, a set of email message and/or other content can be included or excluded from the history that is to be appended to a communication reply, as shown by step 575.

In step 580, quantity thresholds may or may not be active, where quantity thresholds establish a minimum or maximum number of history segments that are to be included in a communication reply. These minimum or maximum numbers can be absolute (e.g., independent of other factors, conditions, and criteria) or can vary depending on other factors (such as relevancy scores, time-based factors, etc.). The applicable minimum and/or maximum quantities can be computed in step 585.

As previously noted, FIG. 5 is not intended to be comprehensive of the criteria contemplated for use by an email history handler. For example, in one embodiment, traffic can be an additional significant criterion that is used by the email history handler. For instance, an amount of data/content within message history can be a significant factor, as can an amount of email traffic delivered by a sender and/or to a recipient within a designated time period (i.e., a few days).

Regardless of the specific criteria that are active in method 500, in step 590, the active criteria, determine scores, conditions, thresholds, and the like can be used to determine history segments to include in a communication reply. These history segments can be appended or otherwise associated with a communication reply.

In step 592, a set of manual actions can be optionally performed, which may affect the history segments to be sent. In one embodiment, an interface, such as interface 350, can be presented to a user to manually override default decisions established by the email history handler. In another embodiment, the determined history segments can be appended to a body of an email message to be used as a reply communication. A user can edit this email history as he constructs content for the message body of the communication reply to suit his/her preferences. In step 594, the communication reply can be sent to the indicated recipients along with the appropriate history segments.

Although method 500 may appear to be somewhat intricate, more simplistic criteria (i.e., a single factor, for example) can be used for selection of email history to be included in a reply message, in one embodiment of the disclosure. This is pictorially emphasized in method 600 of FIG. 6 and in method 700 of FIG. 7.

Figure 6:
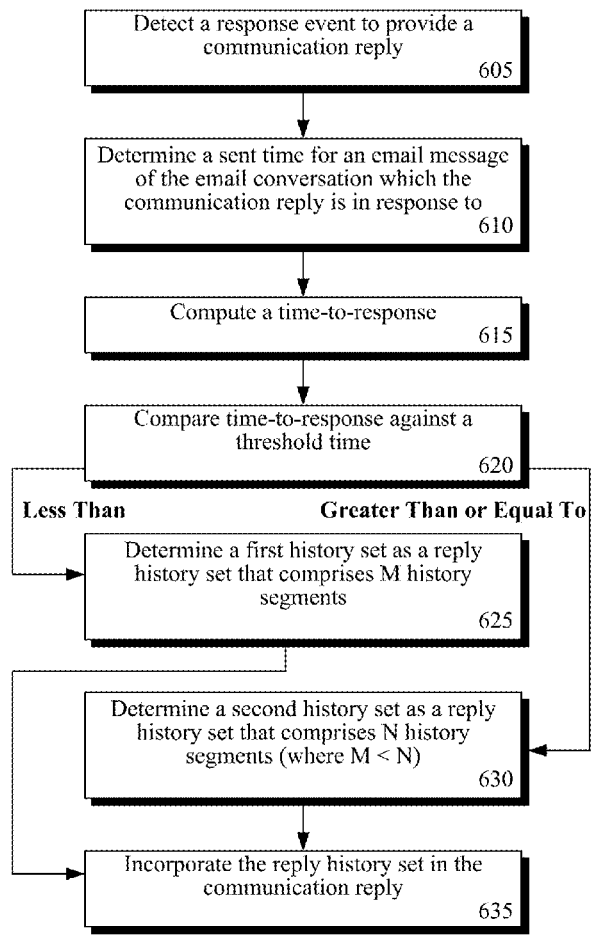
FIG. 6 shows a method, where communication history is based, at least in part, upon a time-to-response of a communication reply in accordance with an embodiment of the disclosure.

FIG. 6 shows a method 600, where communication history is based, at least in part, upon a time-to-response of a communication reply in accordance with an embodiment of the disclosure. In one embodiment, the method 600 can be performed by email history handler 140 or email history handler 242.

Method 600 can begin in step 605, where a response event to provide a communication reply can be detected. In step 610, a sent time for an email message to which the communication reply responds can be determined. In step 615, a time-to-response can be computed, such as by subtracting a current time from the determined sent time. In step 620, the time-to-response can be compared against a previously established threshold time for responding.

If the time-to-response is less than the threshold time, a first history set can be determined as a reply history set, which is shown by step 625. The first history set can include M history segments, where M is an integer value. For example, in one embodiment, M can be equal to zero so that no history segments are included if the response is provided relatively rapidly from the time the message being responded to is sent. In another embodiment, M can equal other values, such as 1, 2, 3, . . . and the like.

If the time-to-response is greater than or equal to the threshold time, a second history set can be determined as a reply history set, which is shown by step 630. The second history set can include N history segments, where N is an integer value. For example, in one embodiment, N can be equal to all the available history segments in an email conversation. In another embodiment, M can equal other values, such as 1, 2, 3, . . . and the like. N can be a value greater than M.

In step 635, the reply history set can be incorporated in the communication reply. Although method 600 shows one time threshold, values of M and/or N can be ranges instead of discrete integer values.

Figure 7:
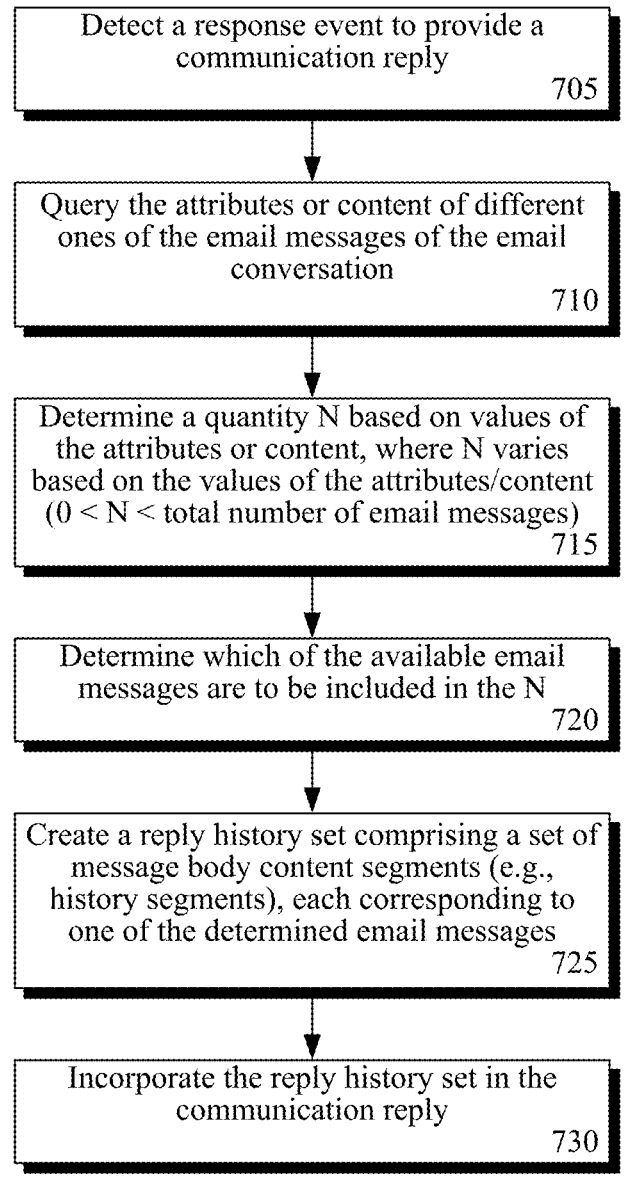
FIG. 7 shows a method, where a quantity of history segments (N) is determined for incorporation into a communication reply in accordance with an embodiment of the disclosure.

FIG. 7 shows a method 700, where a quantity of history segments (N) is determined for incorporation into a communication reply in accordance with an embodiment of the disclosure. In one embodiment, the method 700 can be performed by email history handler 140 or email history handler 242.

Method 700 can begin in step 705, where a response event to provide a communication reply can be detected. In step 710, a set of attributes or content of different ones of the email messages of the email conversation can be queried. In step 715, a quantity N can be determined based on the attributes or content. N can vary based on the values of the attributes and/or content. The value of N can be greater than zero and less than a total number of email messages in the email conversation.

In step 720, a determination can be made as to which of the email messages are to be included in the N quantity of selected messages. The determination can be based on a variety of criteria, such as time, relevancy, key words, user specified custom criteria, and the like. In step 725, a reply history set can be created, where the reply history set is a set of message body content segments (e.g., history segments). Each of the history segments can correspond to one of the determined email messages. In step 730, the reply history set can be incorporated into the communication reply.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
a computing device detecting a response event to provide a communication reply that is an email message which is part of an email conversation, wherein said email conversation comprises a sequence of zero or more response email messages to an initial email message as well as the initial email message, wherein each of the response email messages and the initial email message have a set of attributes unique to that message;
the computing device analyzing content of the communication reply;
the computing device querying attributes of different ones of the email messages of the email conversation in context of the content of the communication reply;
the computing device, for each of the different ones of the email messages, calculating a relevancy score, which is a value representing a quantified relevancy of each of the different ones of the email messages for the communication reply;
the computing device determining a quantity N based on the relevancy scores, wherein the quantity of N varies based on user configured values established through a graphical user interface for including messages based on relevancy;
the computing device creating a reply history set that comprises a set of history segments, wherein each history segment corresponds to one of the N different ones of the email messages of the email conversation; and
the computing device incorporating the reply history set within the communication reply.

2. The method of claim 1, wherein N is greater than zero and less than the total number of email messages in the email conversation, wherein N is an upper threshold of message established by a user input value from within the graphical user interface.

3. The method of claim 1, wherein the relevancy scores is based on history criteria, which comprises behavior based criteria based on behavior of a sender or recipient of the communication reply, wherein said behavior refers to interactive behavior between a user and an email program user interface used by a user to view or create the email messages of the email conversation.

4. The method of claim 1, wherein the relevancy scores are calculated based on configured preferences of a sender who has created the communication reply and not based on configured preferences of recipients of the communication reply.

5. The method of claim 1, wherein the relevancy scores are calculated based on configured preferences of the recipients of the communication reply and not based on configured preferences of a sender of the communication reply.

6. The method of claim 1, wherein the relevancy score is calculated using time based criteria, said method further comprising:
determining a sent time for an email message of the email conversation which the communication reply is in response to;
computing a time-to-response by subtracting a current time from the determined sent time;
in response to determining that the time-to-response is less than a previously established threshold time, determining a first history set as the reply history set; and
in response to determining that the time-to-response is not less than the previously established threshold time, determining a second history set as the reply history set, wherein the second history set comprises a quantity of messages that is less than a quantity of messages of the first history set.

7. A computer program product for delegating email messages for human summaries, the computer program product comprising a non-transitory computer readable storage device having computer usable program code embodied therewith, the computer usable program code comprising:
computer usable program code stored on a non-transitory storage medium that upon being executed by a processor is operable to detect a response event to provide a communication reply that is an email message which is part of an email conversation, wherein said email conversation comprises a sequence of zero or more response email messages to an initial email message as well as the initial email message, wherein each of the response email messages and the initial email message have a set of attributes unique to that message, wherein said set of attributes include a time at which that message was sent;
computer usable program code stored on a non-transitory storage medium that upon being executed by a processor is operable to detect a response event to analyze content of the communication reply;
computer usable program code stored on a non-transitory storage medium that upon being executed by a processor is operable to query the attributes of different ones of the email messages of the email conversation in context of the content of the communication reply;

for each of the different ones of the email messages, computer usable program code stored on a non-transitory storage medium that upon being executed by a processor is operable to calculate a relevancy score, which is a value representing a quantified relevancy of each of the different ones of the email messages for the communication reply;

computer usable program code stored on a non-transitory storage medium that upon being executed by a processor is operable to determine a quantity N based on the relevancy scores, wherein the quantity of N varies based on user configured values established through a graphical user interface for including messages based on relevancy;

computer usable program code stored on a non-transitory storage medium that upon being executed by a processor is operable to create a reply history set that comprises a set of history segments, wherein each history segment corresponds to one of the N different ones of the email messages of the email conversation; and computer usable program code stored on a non-transitory storage medium that upon being executed by a processor is operable to incorporate the reply history set within the communication reply.

8. A method comprising:

a computing device detecting a response event to provide a communication reply that is an email message which is part of an email conversation, wherein said email conversation comprises a sequence of zero or more response email messages to an initial email message as well as the initial email message;

the computing device analyzing content of the communication reply;

the computing device, for each of the different ones of the email messages, calculating a relevancy score, which is a value representing a quantified relevancy of each of the different ones of the email messages for the communication reply;

the computing device comparing the calculated relevancy score to a previously established relevancy percentage, wherein the relevancy percentage is a user input value entered within a graphical user interface of a program being utilized to prepare the communication reply; and incorporating each of the different ones of the email messages having a relevancy score over the previously established relevancy percentage while excluding the email messages having a relevancy score under the previously established relevancy percentage within the communication reply.

9. The method of claim 8, wherein the relevancy scores are calculated based on configured preferences of a sender who has created the communication reply and not based on configured preferences of recipients of the communication reply.

10. The method of claim 8, wherein the relevancy scores are calculated based on configured preferences of a recipients who are to receive the communication reply and not based on configured preferences of sender of the communication reply.

11. The method of claim 8, wherein the relevancy percentage applies to messages from email conversations outside the email conversation.

12. The method of claim 8, wherein the calculated relevancy score is also based on a time between responses of the email message.

13. The method of claim 8, wherein the calculated relevancy score is also based on key word matches found in both the communication reply and the email messages.

14. The method of claim 8, wherein a calculated relevancy score is determined for attachments of the email messages, wherein said attachments are included in the communication reply that have a calculated relevancy score over the previously established relevancy percentage.

15. The method of claim 8, wherein relevancy score also applies to other content sources including Web based content outside the email communication and to corporate files outside the email conversation, wherein the communication reply includes the Web based content and the corporate files having a calculated relevancy score over the previously established relevancy percentage.

16. The method of claim 8, wherein the communication reply comprises a plurality of different recipients, wherein different ones of the different recipients receive a different reply history set within their received version of the communication reply.

* * * * *